UNITED STATES PATENT OFFICE.

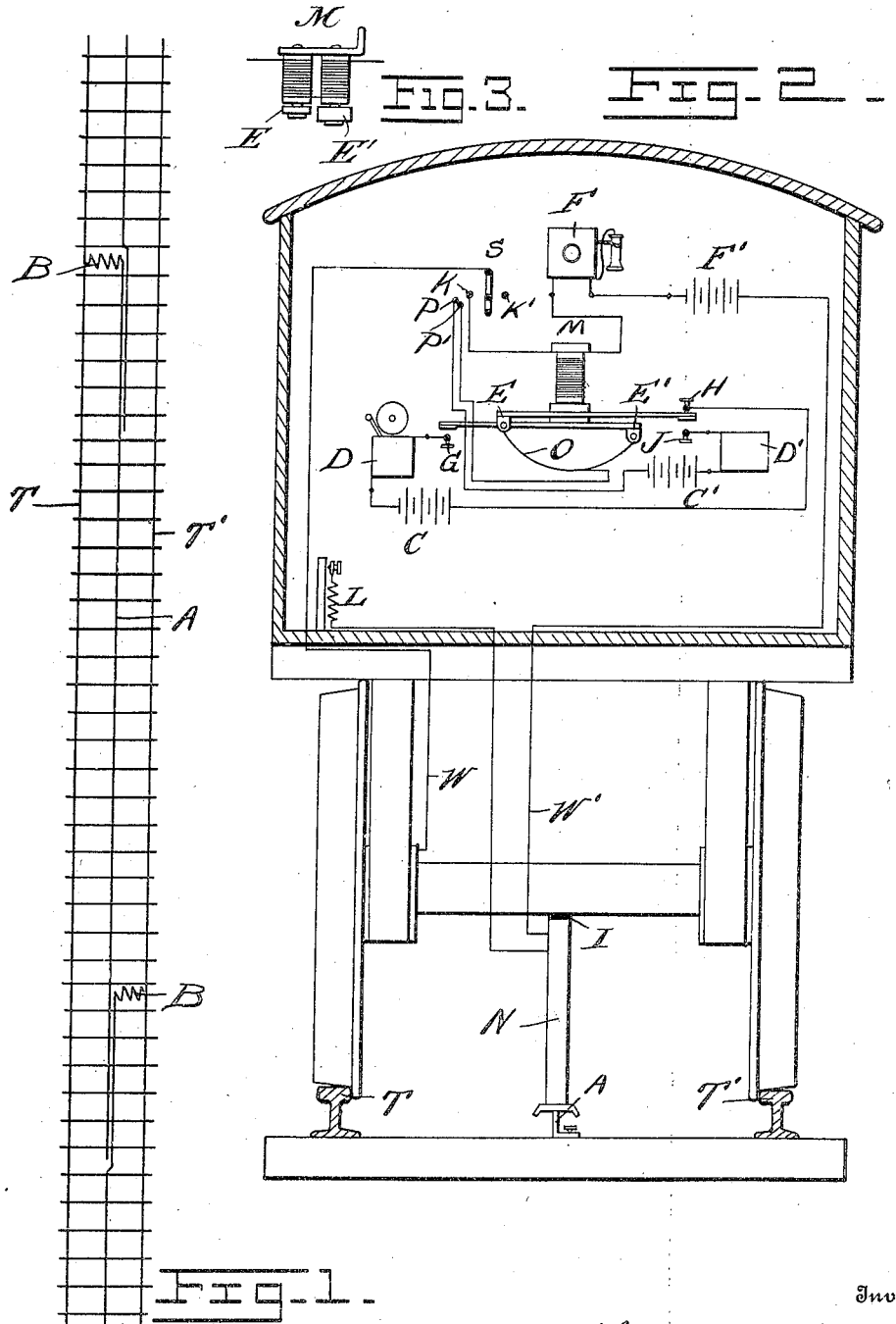

ALBERT F. EELLS, OF BOSTON, MASSACHUSETTS, ASSIGNOR OF ONE-EIGHTH TO WILLIAM J. BARNETTE, UNITED STATES NAVY, OF WASHINGTON, DISTRICT OF COLUMBIA.

RAILROAD AUTOMATIC DANGER AND SAFETY SIGNAL SYSTEM.

No. 914,482.     Specification of Letters Patent.     Patented March 9, 1909.

Application filed August 15, 1908. Serial No. 448,721.

*To all whom it may concern:*

Be it known that I, ALBERT F. EELLS, a citizen of the United States, residing at Boston, in the county of Suffolk and State of Massachusetts, have invented a new and useful Railroad Automatic Danger and Safety Signal System, of which the following is a specification.

My invention relates to a method of giving an alarm on a rail-road motive-car in case of an open draw, open switch, broken track or any derangement in this signal system, or in case two motive-cars are in the same block or section. Also means for telephoning between two motive-cars, or between motive-cars and a station. To accomplish these objects, I propose to connect electrically any desired length or section of track so that an electric current may pass from a battery, suitably located in a motive-car, out through suitable connections to an insulated rod, rail, wire or other suitable device, through similar resistances at the ends of the different sections of track to the main rails, and through these to the wheels of the motive-cars, and from there to the metallic body of the car which is connected by a wire leading to and through the proper instruments installed in the motive-car, back to the other pole of the battery, thus completing the circuit as hereinafter fully described. Or the current may take the reverse direction. In the equipment of instruments is included a telephone in the main circuit. There are also means by which a buzzer, or other desired alarm, will sound whenever there is any break in the main circuit from any cause. When other motive-cars with similar battery and instrumental equipment are in the same section there results either a reduction or augmentation of electrical effect, depending upon whether the installation is connected up with the same or opposite polarities. In either case, suitable devices can be arranged by which armatures may be automatically released or attracted, and through these agencies circuits may be closed which result in sounding an alarm simultaneously in each motive-car. To accomplish these objects, I propose to equip each motive-car with the electrical instruments I will now describe. For clearness of description, I will use the term "battery" to indicate any suitable electro motive force.

One end of a wire is attached to an insulated shoe, wheel, or other device, which is in contact with a rod, rail, wire or other suitable device, the latter to be insulated by the ties or otherwise. The other end of this wire is connected with the proper pole of a battery. The other pole of the battery is connected by wire to a telephone and through that to an electro-magnet, so placed, that each pole may be used to actuate a separate armature insulated and attached to a pivoted make and break circuit arm carrying its metallic make and break circuit connections. After passing around the magnet, the wire runs to one pole of a switch. The second pole of the switch is for the purpose of breaking the main circuit and throwing the equipment out of operation when not required. With the switch turned to the first pole, which includes the magnet in the circuit, the current runs through a wire to the metallic body of the car, thence to the wheels and main rails and thence through the similar resistances at the ends of sections to the rod, rail or wire, insulated by the ties or otherwise, and by this means to the insulated shoe, wheel or other method of contact and its connecting wire, thus completing the circuit to the main battery.

Both of the above mentioned armatures are normally in contact with their respective poles of the magnet as the battery has normally a closed circuit. The armatures are so adjusted that when the effect of the battery is reduced by the entrance of another similarly equipped motive-car in the same section, the insulated armature, attached to its pivoted make and break circuit arm, will be released from the magnet on both cars; and, closing the proper circuit, sound an alarm preferably a bell. The other insulated armature having suitable tension and with its similar pivoted make and break circuit arm will be released from the magnet when the main circuit is broken from any cause, such as open draw, open switch or any other break in the circuit and, by so doing, closes the circuit for a different alarm, preferably a buzzer to indicate the particular character of the fault, and, at the same time, breaks the bell circuit so that both alarm signals will not be sounding at the same time.

The term "tension of the armature" is used to relate to the means used to draw the armature away from the pole of the magnet. Gravity may be used, as shown in the drawings, for one means but not by using a heavy armature of iron, for on the entrance of another similarly equipped car in the same block or section, the armature containing the least iron is released first, consequently the greater tension must be caused by other metal than iron, preferably lead.

By means of the telephone in the main circuit, communication may be carried on between cars and between cars and station properly wired to that section and suitably equipped. Or, the station may call up and talk with a car in any given section with which it is wired.

The following are some of the causes and effects which follow from some of the combinations of installation designed to produce the alarm signals I have described: Two motive-cars similarly equipped and having like battery connections; when in the same section the effect is to reduce the power of the magnet to the extent that the bell armature the one having greater tension will be released, close the bell circuit and sound the alarm. Should the batteries in the two cars have been connected with opposite polarities the effect would be to augment their action, in which case the system would be arranged to have the bell armature, with make and break circuit arm, close the bell circuit when attracted to its magnet. This method of connecting up the batteries in two cars of opposite polarities is not advisable, as it would not be practicable to insure alternate cars being connected with opposite polarities. Again, with similar polar connections and equipments excepting that two electro-magnets are used in place of the single magnet, the same effects will follow and the same results may be accomplished. Again, the same results may be accomplished if, in place of a single battery in each car, it is equipped with a pair of batteries, opposite poles of which are connected together by the wire leading to the shoe. The other two opposite poles are connected each with its own electro-magnet which, by proper connections in combination with armatures attached to their make and break circuit arms will automatically throw the proper batteries in circuit when two motive-cars are in the same section and sound the bell alarm. In all the above combinations, when the main circuit is broken from any cause, the magnets are dead, causing the armatures to be released and the buzzer alarm to sound.

This invention is illustrated in the accompanying drawings, in which—

Figure 1 shows a section of rail-road track with the rails T T' and rod A with wires B B having similar resistance connecting them together at the end of each section. It also shows the lapping but separation of the rods of one section by another to prevent cars colliding at the ends of sections. Fig. 2 shows a sectional view of a motive-car, also wheels, track and electrical connections. Fig. 3 is a side elevation of the controlling magnets and associated armatures.

In the drawings T T' represent the rails of one section and the rod or wire A insulated from the rails. Each section of track is wired to its designated and properly equipped station.

A is the insulated rail or other connecting device in contact with the motive-car through the piece N insulated at I. Conducting wires W and W' are wires leading from the body of the car and shoe to the magnet M and the telephone F and having the battery F' in the circuit.

E and E' are the armatures attached to, but insulated from, their respective make and break circuit arms which close or break the circuit to their respective danger signals—preferably bell and buzzer.

G, H and J are the combined connecting posts and adjusting screws for regulating the distance of the armatures from the respective poles of the magnet M.

O is the wire connecting the two make and break circuit arms and forms part of the means for completing the circuit through the arms for either the bell or buzzer battery. It will be noted that when the buzzer circuit is closed at J by the release of the arm E' the bell circuit is automatically broken at H.

The main circuit, which is normally closed, may be traced as follows:—from battery F', through wire W' to contact shoe N, rail A, resistance B, track rails T, wheels of the car, wire W, switch S, magnet M, and telephone F, back to battery. Thus the magnet M is energized, and the armatures E and E' normally attracted. When this circuit is interrupted, on account of an open switch, break in the rails, or other cause, the magnet M is deënergized, and releases both armatures, thus closing circuit at J through the local battery C', and buzzer D', giving an alarm. In the event however, of two similarly equipped cars coming upon the same block, their batteries will be connected in multiple through the resistance B, of the track or partial circuit, similar poles of the batteries being connected to the rail A. It will therefore be evident, that the current flowing through the resistance B, (which should be large as compared with the resistance of the car carried devices) which current was normally supplied by the battery of one car, will now be equally divided between the batteries of both cars, with the result that the current through the magnets of each car is very much weakened. This weakening of the current causes the magnets to release their armatures, and produce the desired signals or other effect. I preferably arrange the two armatures of each car with different weights or "tensions", or construct the respective controlling magnetic means of different strength, so that, when the current is weakened as described, only one of the armatures, namely, E, is released, while the other armature E', is maintained in its normal position. When the armature E drops, a local circuit is closed through bell D, and battery C, thus sounding an alarm in both cars.

If desired, these alarms can be made to put on the air brakes automatically.

The buzzer sounds only when the main circuit is broken from any cause. If at such time it be desired to stop the buzzer from sounding, turning the switch S from K will automatically break the buzzer circuit at P P'.

In case of open draw, broken track or open switch if it be desired to complete the circuit in order to telephone the connected station, or to another car in the same section, a wire, having resistance in it similar to that in the track, is taken from the shoe connection below the insulation I and connected to the body of the car by means of a push button, switch or other device L, located at some point within the reach of the engineer who, by pressing the button, again completes the circuit. As soon as the push button is released the circuit is again broken as long as there is any break in the line.

I do not wish to be understood as confining myself to the connection A as a means of completing the circuit,—other means may be utilized. Nor do I desire to confine myself to batteries for operating the instruments, for with proper devices any electro motive force may be utilized. Nor do I desire to confine myself to this particular arrangement of instruments and connections; other electrical and magnetic combinations may be installed in cars which will accomplish the same results.

Sufficient electro motive force should be employed to insure the proper working of the instrumental equipment, and the rheostat principle may be utilized to regulate the strength of the current to the desired uniform adjustment of the cars.

One pole of the magnet may be wound with more wire than the other which will give it a stronger attractive power. Or a smaller wire may be used on one pole to make the attractive power different from the other.

What I claim as my invention and desire to secure by Letters Patent is:—

1. In an electric railway signaling system, a track divided into blocks, a car, a signal controlling device carried thereby, a normally closed circuit in which said device is connected, said circuit including the track rails, and means governed by the entry of a similarly equipped car upon the block for weakening the current in said circuit without interrupting the same, and thus causing said controlling device to act.

2. In an electric railway signaling system, a track divided into blocks, a car, a source of current and an electro-magnet carried thereby, a normally closed circuit, including the track rails, in which said magnet and source of current are connected, an armature normally held attracted by said magnet, means governed by the entry of a similarly equipped car into the block for weakening, without deenergizing said magnet and thus causing the same to release said armature, and signaling means controlled by said armature.

3. In an electric railway signaling system, a track divided into blocks, a car, distinctive signal producing means carried thereby, magnetic means controlling said signal producing means, a normally closed circuit in which said magnetic means is connected, said circuit including the track rails, means responsive to a break in said circuit for producing one signal, and means governed by the entry of a similarly equipped car into the block for producing another signal.

4. In an electric railway signaling system, a conductor extending along the track and divided into insulated blocks or sections, each section being connected to the track rails through a resistance, and a plurality of cars movable over the track, each provided with means for electrically engaging said conductor, a battery and a controlling electro-magnet carried by each of said cars and connected in a circuit between said conductor and the track rails, all of said batteries having their like poles joined to said conductor, whereby each such magnet is included in a normally closed circuit, and whereby the presence of two such cars, similarly equipped, upon the same block, results in dividing between them the current flowing through the said resistance.

ALBERT F. EELLS.

Witnesses:
M. A. BOND,
ROBERT A. BOSWELL.